(12) United States Patent
Szum

(10) Patent No.: US 6,240,230 B1
(45) Date of Patent: *May 29, 2001

(54) PROTECTIVE MATERIALS FOR OPTICAL FIBERS WHICH DO NOT SUBSTANTIALLY DISCOLOR

(75) Inventor: David Szum, Elmhurst, IL (US)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,569

(22) Filed: Mar. 6, 1997

(51) Int. Cl.[7] .................. C08L 75/08; C09D 175/16; G02B 6/22; G02B 6/04

(52) U.S. Cl. ................ 385/100; 385/115; 385/128; 385/145; 522/96; 522/97; 428/378

(58) Field of Search ................ 385/145, 100, 385/115, 128; 522/96, 97, 182, 103; 428/378

(56) References Cited

U.S. PATENT DOCUMENTS

| | | |
|---|---|---|
| 4,016,059 | 5/1977 | Trecker et al. . |
| 4,514,037 | 4/1985 | Bishop ........................ 350/96.23 |
| 4,645,297 * | 2/1987 | Yoshihara et al. .............. 350/96.25 |

(List continued on next page.)

FOREIGN PATENT DOCUMENTS

| | | |
|---|---|---|
| 0 407 004 A2 | 4/1991 | (EP) . |
| 565 798 | 10/1993 | (EP) . |
| 566 801 | 10/1993 | (EP) . |
| 780 712 | 6/1997 | (EP) . |
| 95/00348 | 4/1996 | (NL) . |

OTHER PUBLICATIONS

Thomas E. Gismondi, "The Influence of Acrylate Monomers on the Resistance of UV–Cured Coatings to UV–Induced Degradation," Journal of Radiation Curing, Apr., 1984, pp. 14–18.

Japanese Patent Abstract, XP–002078876 re: coating materials for printed paper, inventor: Yamashiro, Yutaka.

Japanese Patent Abstract, XP–002078877 re photocurable compositions; inventor: Matsui, Riichi.

Photoinitiators and Their Influence on Color Development in UV Cured Films, Steven R. Schmid, J. Radiation Curing, Apr. 1984, pp. 19–23.

Thermo–Oxidative Aging of a Primary Lightguide Coating in Films and Dual–Coated Fibers, D.A. Simoff et al., Polymer Engineering and Science, 1989, vol. 29, pp. 1177–1181.

Ultraviolet Color Coding of Optical Fibers —A Comprehensive Study, S. Vannais and J. Reese, Wire Journal International, Oct. 1991, pp. 71–76.

Aspects of Thermo–Oxidative and Hydrolytic Degradation in Optical Fiber Cable Matrix Materials, T. Bishop et al., International Wire and Cable Symosium Proceedings 1992, pp. 442–446.

(List continued on next page.)

Primary Examiner—Susan W. Berman
(74) Attorney, Agent, or Firm—Pillsbury Winthrop LLP

(57) ABSTRACT

Radiation-curable compositions are disclosed which, after cure, are substantially non-yellowing. The compositions are particularly tailored for coating and bundling of optical fibers. A first preferred composition is based on a polyether-type of oligomer diluted with reactive diluents. Isocyanurate structures are included in the composition to raise Tg. A second preferred composition is based on fatty oil comprising (meth)acrylate groups and bisphenol A derivatives comprising (meth)acrylate groups. Photoinitiators can be included to increase cure speed. The formulations do not include material amounts of ingredients which tend to cause yellowing or, in theory, extended conjugation in the cured compositions.

13 Claims, 1 Drawing Sheet

U.S. PATENT DOCUMENTS

| | | |
|---|---|---|
| 4,701,016 | 10/1987 | Gartside, III et al. ............ 350/96.23 |
| 4,716,209 | 12/1987 | Schmid et al. ........................ 526/261 |
| 4,812,489 | 3/1989 | Watanabe et al. . |
| 4,900,126 * | 2/1990 | Jackson et al. ................... 350/46.23 |
| 4,904,051 * | 2/1990 | Broer et al. .......................... 350/96.3 |
| 4,932,705 | 6/1990 | Miller .................................... 296/50 |
| 4,962,992 | 10/1990 | Chapin et al. .................... 350/96.23 |
| 4,992,524 | 2/1991 | Coady et al. .......................... 528/49 |
| 5,015,068 | 5/1991 | Petisce ................................ 350/96.3 |
| 5,093,386 | 3/1992 | Bishop . |
| 5,104,433 | 4/1992 | Chapin . |
| 5,146,531 | 9/1992 | Shustack . |
| 5,219,896 | 6/1993 | Coady et al. .......................... 522/96 |
| 5,352,712 | 10/1994 | Shustack . |
| 5,363,468 * | 11/1994 | Yoshikawa et al. ................. 385/145 |
| 5,527,835 | 6/1996 | Shustack . |
| 5,539,014 | 7/1996 | Swedo et al. . |

OTHER PUBLICATIONS

A Measurement of the Contribution of UV Cured Coatings and Ink Binders Toward Color Change of UV Cured Dyes, Radtech Europe '93 Conference Proceedings, May 1993, p. 747.

Color Change of UV–Cured Inks, D.M. Szum, Polymers and Paint Color Journal, Nov. 1993, vol. 183, pp. 51–53.

*Lightguide Digest,* 1992, No. 1, pp. 2–5.

"Radiation Curable Coatings; A Technology for the 1980's" Pasternack, G., The Proceedings of the 1980 Paper Synthetic Conference, Sept. 1980.

*Bailey's Industrial Oil and Fat Products,* 4th Ed. vol. 1, pp. 130–131 (1979).

* cited by examiner

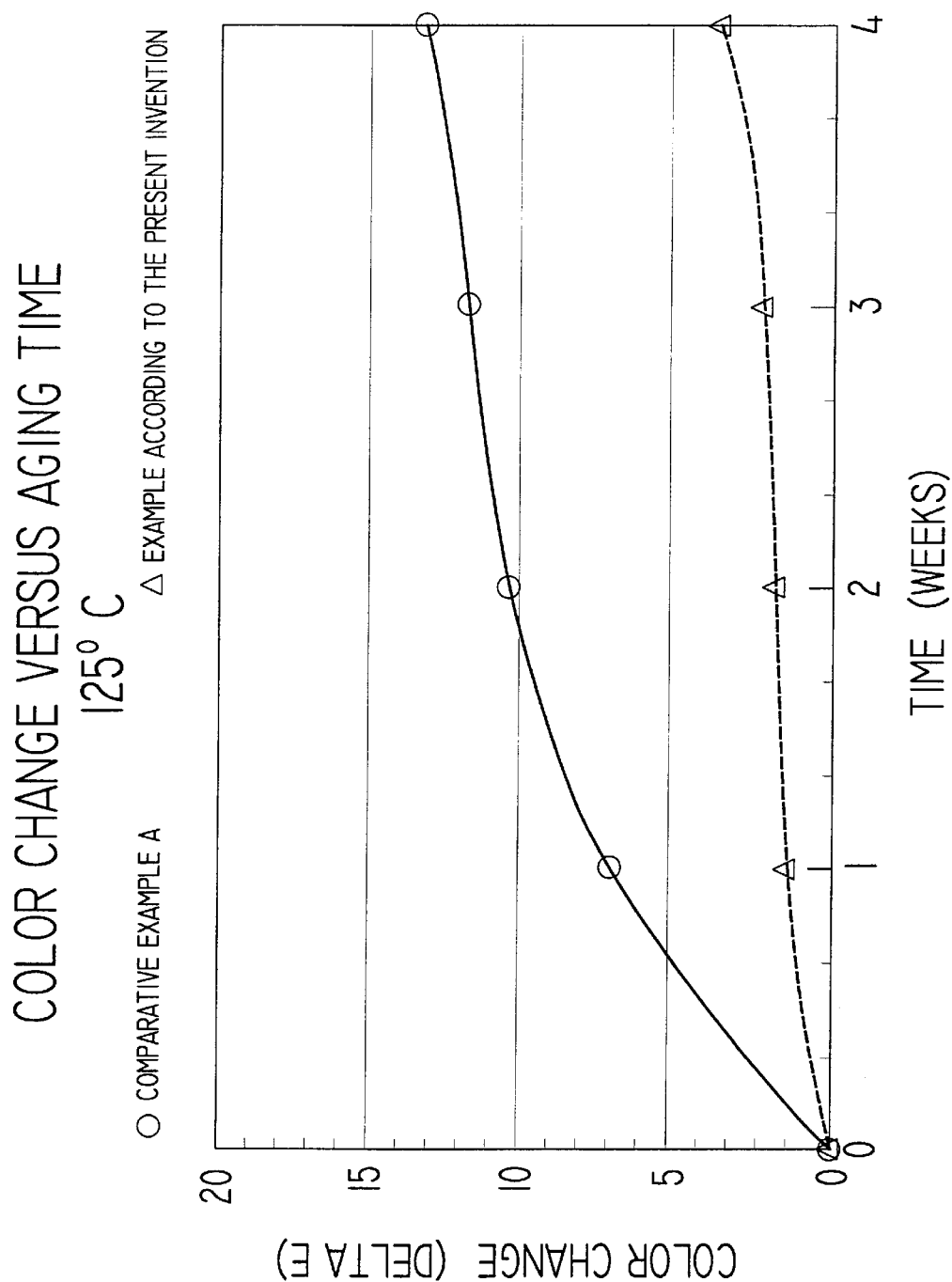

PROTECTIVE MATERIALS FOR OPTICAL FIBERS WHICH DO NOT SUBSTANTIALLY DISCOLOR

BACKGROUND OF THE INVENTION

1. Field of the Invention

The present invention relates to substantially non-yellowing radiation-curable protective coating compositions, and in particular, compositions which are tailored for protecting and/or bonding optical fibers within an optical fiber ribbon or cable structure.

2. Description of Related Art

Glass optical fibers have become a medium of choice for transmitting information in the modern telecommunications era. Immediately after their manufacture, the fibers are coated with relatively soft inner primary coatings, which directly contact the underlying glass optical fibers. They are then coated with harder outer primary coatings which overlay the inner primary coatings (outer primary coatings are also called secondary coatings). This dual coating structure both maximizes fiber transmission efficiency and preserves the desirable characteristics of freshly-prepared, pristine glass fiber. To maximize telecommunication efficiency, multiple strands of coated optical fibers are further encased in ribbons and cables. Tertiary coatings and jacketing, bundling, and matrix materials further identify and protect the glass fiber and bond bundles of fibers in ribbon and cable structures. Radiation-curable materials are particularly useful in this art because they allow for fast production of coated fiber and ribbons. These practices are conventional in the optical fiber art.

In one aspect of this technology, colorants or inks can be used to help distinguish one strand of optical fiber from another simply by color. Color is important when, for example, repair and/or splicing of the optical fiber is needed. However, aging can make such color differentiation difficult if color changes substantially over time. Substantially colorless materials must remain colorless, and the color of colored materials must not change despite environmental stress. Environmental stresses include, for example, light, oxidation, temperature, humidity, water, acid, base, chemicals, and solvents. Severe short term aging studies on coated fiber help predict the long-term reliability of the fiber. For substantially colorless materials, yellowing is the most common form of discoloration. Discoloration and yellowing is conventionally measured in terms of the delta E parameter.

Prior art references recognize the yellowing problem. See, for example, U.S. Pat. Nos. 5,146,531 to Shustack and 4,962,992 to Chapin et al. See also, *Lightguide Digest*, 1992, No. 1, pgs. 2–5. These references disclose coated optical fibers and radiation-curable urethane acrylate coating compositions which allegedly demonstrate improved non-yellowing behavior. However, the Chapin patent discloses that the outer primary coating should have a sufficiently low glass transition temperature (Tg<60° C.) to avoid delamination of the coating system from the optical fiber and provide suitable resistance to microbending. Consistent with this, the Shustack patent discloses a Tg value of only 50° C. Hence, there is no motivation in these references to prepare materials with Tg higher than 50° C.

A related disclosure for allegedly non_yellowing optical fiber primary and secondary coating compositions is U.S. Pat. No. 5,352,712 to Shustack. According to this patent, the outer primary coating again should have a glass transition temperature of about 50° C., so again, there is no teaching or suggestion to elevate Tg above a value of about 50° C. Also, U.S. Pat. No. 5,527,835 to Shustack discloses that coatings are to be non-yellowing but does not suggest outer primary coatings having a relatively high Tg.

Furthermore, U.S. Pat. No. 5,093,386 to Bishop et al. discloses polyether-based compositions useful as a secondary coatings or bundling materials. However, these compositions require use of a polyurethane having a tricyclodecane structure in the backbone. This structure can be undesirable because it imparts high viscosity.

Acrylated epoxy types of optical fiber coatings are generally viewed as prone to yellowing, as discussed in, for example, the aforementioned U.S. Pat. No. 5,146,531. In addition, it is generally understood that coatings photodegrade when based on acrylated epoxy derivatives of bisphenol A. See the publication, "Radiation Curable Coatings; A Technology for the 1980's" by G. Pasternack in "The Proceedings of the 1980 Paper Synthetic Conference," Cincinnati, Ohio, September 1980. In particular, yellowing has been attributed to the aromatic character of acrylated epoxies. Hence, it would be surprising if aromatic-based coatings are non-yellowing.

Aspects of thermooxidative and hydrolytic degradation, including yellowing and delta E measurements, are discussed in T. Bishop et. al. *International Wire & Cable Symposium Proceedings*, 1992, pgs. 442–446. However, there is no suggestion to prepare compositions having relatively high Tg which also have the substantially non-yellowing character disclosed herein.

Hence, discoloration in general and yellowing in particular is a problem in the optical fiber coating industry. Moreover, substantial non-yellowing compositions are difficult to achieve which also exhibit other required properties. Modern optical fiber technology depends on, and urgently demands, better substantially non-yellowing optical fiber protective materials with a better balance of properties.

Objects of the present invention include providing radiation-curable compositions which, when cured, do not substantially yellow (i.e., low delta E) and yet have other desirable properties. In particular, these materials should yellow less than the allegedly non-yellowing coatings disclosed in, for example, the aforementioned U.S. Pat. Nos. 5,146,531 and 5,352,712 to Shustack. These and other objects have been achieved.

SUMMARY OF THE INVENTION

The present invention provides the surprising discovery that radiation-curable compositions, when cured, can be formulated to discolor and yellow less than even known allegedly non-yellowing compositions. Surprisingly, this substantial non-yellowing can be attained without loss of acceptable cure speeds.

Moreover, unified principles to achieve non-yellowing are used to provide multiple embodiments of the present invention. This allows the formulator to select from several types of composition for a particular application to achieve substantial non-yellowing. These multiple embodiments, however, share in common at least one property: the compositions are formulated by principles disclosed herein so that, after cure, they exhibit better non-yellowing performance than known prior art coatings.

In brief, the present invention provides an optical fiber apparatus for transmitting light signals comprising:
  at least one optical fiber transmission path,
  at least one protective region for the transmission path,
    wherein the protective region comprises a radiation-cured composition which exhibits a non-yellowing, delta E value of less than about 12 after four weeks of aging at 125° C.

The present invention also provides a radiation-curable composition comprising the following pre-mixture ingredients before radiation cure:

(A) about 20 wt. % to about 80 wt. % of at least one urethane (meth)acrylate oligomer comprising (i) at least one polyether oligomer backbone, (ii) at least one aliphatic urethane linking group, and (iii) at least one endcapping radiation-curable group;

(B) about 20 wt. % to about 80 wt. % of at least one monomer diluent for the oligomer, (C) optionally, an effective amount of at least one photoinitiator, wherein the glass transition temperature of the composition, after radiation cure, is greater than about 5° C., and wherein the composition, after radiation cure, is substantially non-yellowing. The cured compositions also advantageously exhibit good cure speed, oxidative stability, and tough film properties.

The present invention also provides a radiation-curable composition comprising a mixture of the following pre-mixture ingredients before radiation cure:

(A) about 5 wt. % to about 50 wt. % of at least one fatty oil derivative comprising (meth)acrylate groups, (B) about 20 wt. % to about 90 wt. % of at least one bisphenol A derivative comprising (meth)acrylate groups, (C) optionally, an effective amount of at least one photoinitiator, wherein the glass transition temperature of the composition, after radiation cure, is greater than about 50° C., and wherein the composition, after radiation cure, is substantially non-yellowing. In this embodiment, additional advantages include very low water sensitivity which is expected to enhance optical fiber strength retention.

These embodiments provide useful protective coating materials for optical fibers. If the compositions are properly formulated to have the required properties (e.g., modulus), they can serve as outer primary coating materials, matrix materials, and other types of radiation-curable materials needed in optical fiber technology.

BRIEF DESCRIPTION OF THE DRAWING

FIG. 1 illustrates a comparison of the substantially non-yellowing behavior of a cured coating according to the present invention against that of a prior art optical fiber coating.

DETAILED DISCLOSURE OF THE PRESENT INVENTION

After their cure, the compositions of the present invention surprisingly exhibit substantial non-yellowing behavior which is believed superior to that of prior art coatings. Non-yellowing is achieved by a pre-selection of ingredients which is believed to avoid formation of extended conjugation upon aging. Yellow materials in general are characterized by extended conjugation which causes strong absorption in the UV-visible region of the electromagnetic spectrum. The result is reflection of electromagnetic wavelengths associated with the color yellow. In the past, such groups as aromatic groups and nitrogen-containing materials like vinyl lactams have been thought to induce yellowing. A concept of this invention is to allow use of aromatic and nitrogen-containing materials (and the advantages they may give) without incurring the penalty of yellowing.

Without being limited by theory, the approach taken here is to select materials which either (i) interrupt any extended conjugation which may form upon degradation and cause yellowing (e.g., use of bisphenol A epoxy acrylates rather than bisphenol F epoxy acrylates), or (ii) due to their inherent structure, they do not allow double bond formation in the critical regions (e.g., use of trishydroxy ethyl isocyanurate triacrylate rather than aromatic groups).

The compositions can cure by free-radical or cationic polymerization of ethylenic unsaturation. Free-radical polymerization of (meth)acrylate unsaturation is preferred, wherein (meth)acrylate means methacrylate, acrylate, or mixtures of both. Acrylate cure is generally preferred over methacrylate cure.

The ethylenic unsaturation can also be, for example, a vinyl ether or vinyl maleate unsaturation which can cure by cationic or free radical polymerization or copolymerization. Nonacrylate cure systems are disclosed in, for example, U.S. Pat. Nos. 5,340,653 to Noren et al; 4,956,198 to Shama et al.; and 4,999,216 to Gaske et al., the complete disclosures of which are hereby incorporated by reference.

One embodiment of the present invention provides compositions which comprise at least one urethane (meth) acrylate oligomer, at least one monomer diluent (or reactive diluent), and optional photoinitiator. The ingredients are selected so that the composition, when cured, exhibits a high glass transition temperature.

The oligomer comprises at least one polyether backbone, at least one aliphatic urethane linking group, and at least one end-capping radiationcurable group. The oligomer structure is not limited by the process used to prepare the oligomer. Conventional synthetic practice in this art can be used to prepare this oligomer. In a preferred embodiment, the oligomer is a reaction product of at least one polyether polyol backbone component, at least one multifunctional isocyanate linking compound, and at least one radiationcurable end-capping compound.

The number average molecular weight of the polyether polyol can be, for example, between about 500 g/mol, and about 10,000 g/mol, and more preferably between about 750 g/mol and about 8,000 g/mol. Most preferably, the polyether polyol molecular weight is less than about 4,000, and most preferably, less than about 2,500 g/mol. GPC can be used to estimate number average molecular weight.

The oligomer backbone can comprise homopolymer structures or random or block copolymer structures. Conventional synthetic methods can be used to prepare copolymeric structures. Not all repeat units in the oligomer backbone need be polyether units, although that is preferred. Combinations of different polyether backbone repeat units can be used, as well as combinations of polyether and non-polyether repeat units. For example, some ester or carbonate linkages can be incorporated into the oligomer backbone to the extent that substantial non-yellowing is preserved.

Conventional polyether polyols can be used to the extent that substantial non-yellowing can be achieved. Examples of suitable polyether polyols are disclosed in, for example, U.S. Pat. Nos. 4,992,524; 5,093,386; and 5,527,835, the complete disclosures of which are hereby incorporated by reference. Aliphatic types of polyether polyols are preferred. Polyether diols are preferred.

Suitable examples of polyether diols include hydroxyl-terminated polyethylene glycol, polypropylene glycol, polytetramethylene glycol, polyheptamethylene glycol, polyhexamethylene glycol, and polydecamethylene glycol. Polyether polyols can be used which are prepared by ring-opening polymerization of one or more types of cyclic ether compounds which are ionpolymerizable. Ion-polymerizable cyclic ether compounds include, for example, ethylene oxide, propylene oxide, butylene oxide, and butene-1-oxide. The oligomer backbone can comprise substituents bonded to the polyether backbone such as, for example, methyl, ethyl, or higher alkyl groups which can be used to tailor the properties of the protective materials. Thus, for example, copolymers based on copolymerization of tetrahydrofuran and methyltetrahydrofuran can be used.

The polarity of the oligomer backbone can be tailored with use of hydrophobic monomers units (e.g., tetramethylene oxide) and more hydrophilic monomers (e.g., ethylene oxide), whereas monomer units like propylene oxide have intermediate hydrophilicity. Crystallization of the oligomer can be controlled by, for example, the molecular weight and symmetry of the backbone structure. For example, alkyl side groups like methyl alter the symmetry of the backbone and may affect crystallization.

Urea linkages can be incorporated into the oligomer backbone to the extent that yellowing is not induced in the cured composition. For example, U.S. Pat. No. 4,923,915; EP Pat. Publication 0,204,160 (A2); and EP Pat. Publication 0,204,161 (A2) disclose urethane acrylate coatings which comprise oligomers having urea groups. However, urea linkages in general may tend to cause yellowing, are not preferred, and are preferably excluded.

A preferred example of an oligomer backbone is a polypropylene glycol backbone which can be formed with use of a polypropylene glycol diol having a number average molecular weight of about 1,000 g/mol.

The oligomer backbone can be linked to an end-capping radiation-curable group via a conventional intermediate urethane linking group. The invention is not limited by how this linking group is formed. However, the urethane linking group can be generated by conventional synthetic methods with use of multifunctional isocyanates which react with hydroxyl compounds to form urethane linkages. Many examples of linking multifunctional isocyanate compounds are known in the art of optical fiber coatings and can be used to the extent that non-yellowing is achieved. Aliphatic urethane linking groups and multifunctional isocyanates are preferred including, linear aliphatic, dicycloaliphatic, and cycloaliphatic isocyanates. In general, aromatic multifunctional isocyanates are not preferred versus aliphatic multifunctional isocyanates, although small amounts of aromatic content may be allowed to the extent that substantial non-yellowing is not impaired. The isocyanate group is preferably not bonded directly to the aromatic group if aromatic groups are present. Use of diisocyanates is preferred.

Suitable examples of multifunctional isocyanates, which can react to form the urethane linking group, include those having 3 to 25, and preferably, 4 to 20 carbon atoms. Exemplary aliphatic isocyanates include but are not limited to 2,2,4-trimethyl-1,5-pentamethylene diisocyanate; dicyclohexylmethane-4,4'-diisocyanate; 1,4-tetramethylene diisocyanate; 1,5-pentamethylene diisocyanate; 1,6-hexamethylene diisocyanate; 1,7-petamethylene diisocyanate; 1,8-octamethylene diisocyanate; 1,9-nonamethylene diisocyanate; and 1,10-decamethylene diisocyanate. Tetramethylxylene diisocyanate (TMXDI, Cytec., Inc.) is another suitable example. TMXDI does not have the isocyanate group linked directly to the aromatic ring which should encourage non-yellowing. Additional examples of multifunctional isocyanate compounds can be found in the aforementioned U.S. Pat. No. 5,146,531, the complete disclosure of which is hereby incorporated by reference. Mixtures of multifunctional isocyanate compounds can be used. A particularly preferred example of an aliphatic diisocyanate is isophorone diisocyanate.

The oligomer's radiation-curable end-capping groups can be (meth)acrylate, and are preferably acrylate. They can be incorporated onto the oligomer by conventional synthetic methods well-known in the art of urethane (meth)acrylate optical fiber coatings. Again, the invention is not limited by how the radiation-curable group is incorporated onto the oligomer.

(Meth)acrylate compounds can be used in oligomer synthesis and function to end-cap the oligomer and provide unsaturation suitable for rapid radiation-cure, and in particular, ultraviolet light radiation-cure. The (meth)acrylate is preferably selected to maximize cure speed and allow for ready oligomer preparation. In general, the oligomer can contain two acrylate reactive groups per oligomer molecule, although the formulation can be tailored with use of more (meth)acrylate reactivity.

Conventional hydroxy alkylacrylate or hydroxy alkylmethacrylate compounds can be used in oligomer synthesis. Alkyl groups can be, for example, $C_3$–$C_7$ groups such as propyl and butyl. A particularly preferred example is the use of hydroxyethyl acrylate to prepare the end-capping group.

U.S. Pat. No. 5,093,386 to Bishop et al. discloses synthetic strategies and formulation methods, the complete disclosure of which is hereby incorporated by reference. The oligomer synthesis can affect the molecular weight of the oligomer due to coupling of multiple backbone units in a single oligomer molecule. The urethane reaction employed in oligomer synthesis can be accelerated by the presence of suitable catalysts well-known in the polyurethane arts. Examples include dibutyl tin dilaurate, dibutyl tin oxide, and dibutyl tin dichloride.

During oligomer synthesis, other types of repeat units besides polyethers can be incorporated into the oligomer backbone provided that non-yellowing characteristics are not substantially compromised. For example, relatively stable carbonate units can be included, as disclosed for example in U.S. Pat. No. 5,219,896, the complete disclosure of which is hereby incorporated by reference.

The number average molecular weight of the oligomer can be determined by GPC methods. The oligomer molecular weight can be less than about 10,000 g/mol, and more preferably, less than about 5,000 g/mol, and most preferably, less than about 3,000 g/mol. Some polyethers may tend to crystallize at higher molecular weights which is generally undesirable. Molecular weight distribution, or polydispersity (Mw/Mn), is preferably narrow and can be, for example, between about 1.1 to about 3 as measured by gel permeation chromatographic analysis with use of polystyrene standards.

Useful radiation-curable coating compositions can be prepared with both low and high amounts of oligomer, and the same fiber and cable manufacturers typically demand a wide variety of properties from different coatings depending on their particular application. Hence, the oligomer amount can be determined for a given application. The amount of oligomer in the composition, before cure, can be between, for example, about 20 wt. % and about 80 wt. %, and preferably, between about 30 wt. % and about 70 wt. %, and more preferably, between about 40 wt. % and about 60 wt. %.

Mechanical properties like Tg and modulus are not only determined by the oligomer, but are also affected by the selection of reactive or monomer diluent. The reactive diluent system is selected to impart substantial non-yellowing and provide advantageous Tg, modulus, hydrophilicity, and other important properties. In particular, diluent mixtures are preferred to attain optimal properties. For example, one monomer diluent can serve to increase crosslink density and modulus. Another monomer diluent can help tailor the material's polarity and shrinking character. Use of diluents particularly with respect to secondary coatings (although isocyanurate functionalities and high Tg are not taught therein) is discussed in, for example, the aforementioned U.S. Pat. Nos. 5,146,531 and 5,352,712, the complete disclosures of which are hereby incorporated by reference.

Diluents can have one, two, three, or more unsaturation sites which can crosslink during radiation cure and become incorporated into a network molecular structure. Preferred diluents include acrylate and methacrylate compounds, and preferably acrylates, which radiation-cure by free-radical polymerization. Conventional diluents can be used to the extent that substantial non-yellowing is attained.

Diluents can comprise, for example, hydrocarbon or etheric groups, in addition to the radiation-curable group. Suitable examples include hexylacrylate, 2-ethylhexylacrylate, isobornylacrylate, isodecylacrylate, laurylacrylate, stearylacrylate, ethoxyethoxyethylacrylate, laurylvinylether, 2-ethylhexylvinyl ether, and the like. Diluents having two or more unsaturation sites include $C_2$–$C_{18}$ hydrocarbondiol-diacrylates, $C_3$–$C_{18}$ hydrocarbon triacrylates, and the polyether analogs thereof, 1,6-hexanedioldiacrylate, trimethylolpropanetriacrylate, hexanedioldivinylether, triethyleneglycoldiacrylate, pentaerythritoltriacrylate, ethoxylated bisphenol-A diacrylate, and tripropyleneglycol diacrylate. As with oligomer selection, diluent selection can be tailored to the particular application.

Composition viscosity, before cure, can be tailored by the amounts and structures of the oligomer and monomer diluent. For example, the molecular weight of the oligomer and the amount of diluent can affect viscosity. The viscosity of the composition before cure is conventional and can be, for example, between about 1,000 cps to about 12,000 cps, and preferably, between about 3,000 cps and about 10,000 cps at 25° C.

There are no particular limitations to the total amount of diluent provided that substantial non-yellowing and proper viscosity are achieved. The person skilled in the art can determine and select functionally effective amounts for a particular application. The total amount of reactive diluent can be, for example, between about 20 wt. % and about 80 wt. %, and preferably, between about 30 wt. % and about 70 wt. %, and more preferably, between about 40 wt. %t and about 60 wt. %.

The selection of the oligomer and diluent in particular allows the cured composition to have Tg values greater than about 50° C., and preferably, values greater than about 70° C., and more preferably, greater than about 90° C. Tg can be measured by conventional thermal mechanical analysis and taken from the tan delta maximum. Proper modulus is also important and can be measured by conventional thermal mechanical methods. Rubbery modulus values can be, for example, at least about 8 MPa, and is preferably greater than about 15 MPa, and is more preferably, greater than about 25 MPa. Relatively high Tg coatings are preferred and seem to be more resistant to discoloration and yellowing. The present invention is not limited by theory, but it is thought that this may be due to the lack of mobility of the polymer chains which would tend to limit inter- and intra-molecular polymer chain degradation reactions.

Rigid groups should be present to raise Tg. Ring structures encourage rigidity. Ring structures include, for example, isocyanurate, tricyclodecane, and xylene.

In a preferred embodiment, at least one oligomer, at least one diluent, or both comprise at least one isocyanurate group. Preferably, this isocyanurate group is present in the reactive diluent system rather than the oligomer. However, multifunctional isocyanate compounds comprising isocyanurate can be used to prepare the oligomer.

The isocyanurate ring, whether present in the diluent or oligomer, functions to raise the Tg and modulus of the coating. In this sense, the isocyanurate ring functions like an aromatic group. However, unlike some aromatic groups, this ring apparently does not generally contribute to substantial yellowing in the coating. The isocyanurate ring also generally increases the material's polarity in contrast to less polar aromatic rings. Other diluents together with the isocyanurate group may also help raise Tg, but the isocyanurate group is particularly effective in raising Tg.

The present invention is not limited by how the isocyanurate-containing component is formed. Conventional methods can be used to prepare the oligomer or diluent. Isocyananurate compounds can be formed, for example, by trimerization of isocyanate compounds. If isocyanate trimerization is used to form the isocyanurate, the isocyanate can be a monoisocyanate or a multifunctional isocyanate, although monoisocyanates are preferred. An isocyanurate compound can be derivatized for radiation cure by conventional methods. For example, the isocyanurate structure can be linked with (meth)acrylic unsaturation so that it binds in with the coating during cure.

A preferred type of isocyanurate compound is an acrylate derivative of trimerized monoisocyanate compound such as, for example, a trishydroxyalkyl isocyanurate triacrylate compound. A particularly preferred example is trishydroxyethyl isocyanurate triacrylate (Sartomer, SR-368). Other examples include the triisocyanurate of isophorone diisocyanate, also called T-1890 (Huls), and the hydroxyl (alkyl) acrylate derivatives thereof.

The component which contributes the isocyanurate functionality can be present in functionally effective amounts which raise Tg to sufficient level to attain substantial non-yellowing. For example, the composition can include an isocyanurate-containing diluent in amounts of at least 5 wt. %, and preferably, at least 15 wt. %, and more preferably, at least 25 wt. %. At most, it can be present at about 80 wt. %.

The isocyanurate group will generally function to raise or help raise the glass transition temperature of the coating which is based on an oligomer with a relatively flexible backbone. In tailoring the composition's properties, however, the formulator can use other monomers which will, as required, balance this effect. For example, alkyl acrylates like isodecyl acrylate or lauryl acrylate can be Tg lowering monomers. Other reactive monomers can also serve to balance the polar nature of the isocyanurate group which may increase, for example, moisture absorption. Hence, the desired balance of properties can be achieved.

Polar vinyl lactam monomer diluents like vinyl caprolactam and N-vinylpyrrolidone have been conventional but are preferably excluded. It is believed that they tend to cause yellowing and are either not used at all or used in only minimal amounts to the extent that substantial non-yellowing is not compromised. However, these diluents may increase cure speed. Hence, it may be desirable to include them as long as non-yellowing is achieved. Like vinyl lactams, it is possible that the nitrogen-containing isocyanurate group also can function to increase cure speed. The person skilled in the art can tailor their use to provide a suitable balance of properties (e.g., sufficient non-yellowing together with sufficient cure speed).

Other nitrogen-containing, amine types of compounds should be used cautiously in the composition, and are preferably excluded. Preferably, amines and amides are present in amounts less than 5 wt. %, and more preferably, less than 1 wt. %, and most preferably, less than 0.1 wt. %. For examples, amides may cause corrosion. In addition, amines are believed to cause corrosion of optical glass fiber in the presence of moisture: see the thesis publication entitled "Lifetime of Pristine Optical Fibers" by P. C. P. Bouten, October 1987 (Technische Universiteit Eindhoven); and the publication "Fast Curing Primary Buffer Coatings for High Strength Optical Fibers" by Broer et al., *J. Lightwave Technology*, July 1986, pgs. 938–941. This may result from pH elevation of ingressed moisture (see U.S. Pat. No. 5,181,269 to Petisce). The person skilled in the art can determine the effect of basic, nitrogen-containing components on the yellowing properties.

The present invention is not limited by theory. Several degradation mechanisms may contribute to discoloration in general and yellowing in particular (i.e., raise delta E). However, yellowing can be generally associated with extended conjugation. Therefore, as discussed above, composition components in general and reactive diluents in particular should be excluded which can be a source of conjugated double bonds upon aging. Examples of such monomers are believed to include conventional monomers ethoxylated nonylphenol acrylate, phenoxyethyl acrylate, and phenyl acrylate.

In general, the compositions of this first embodiment, after cure, should include saturated rather than unsaturated linkages, and should not include linkages that can oxidize, photodegrade, or hydrolyze to form unsaturated linkages. In addition, unbound components should be minimized.

Although the oligomer and diluents of the present composition are preferably designed for (meth)acrylate cure, other less preferred conventional radiation-cure systems can be used as well like vinyl ether or vinyl maleate.

Photoinitiators can be used to increase the rate of cure and are required for an optical fiber production process which employs UV cure. The amount of photoinitiator, when present, is not critical, but will be determined by such factors as the effect of the photoinitiator on yellowing, the activity or efficiency of the photoinitiator, the desired cure speed, and surface profiles of the cure process. The total amount of photoinitiator can be, for example, between about 0.1 wt. % and about 10 wt. %, and preferably, between about 0.5 wt. % and about 5 wt. %. Mixtures of photoinitiators can be used.

Some photoinitiators generally tend to cause yellowing more than others, and relatively non-yellowing photoinitiators are preferred. The publication "Photoinitiators and their Influence on Color Development in UV Cured Films" by Steven Schmid, *J. Radiation Curing pgs.* 19–23 (April 1984) discusses the effect of photoinitiators on the color development of UV cured films, the complete disclosure of which is hereby incorporated by reference. This reference discloses that discoloration can be associated with photoinitiator type and decreased in the order: p-phenoxy-2,2-dichloroacetophenone>benzophenone>2,2-dimethoxy-2-phenylacetophenone>2-hydroxy-2-methyl-1-phenylpropanone>diethoxyacetophenone>alpha-hydroxycyclohexyl phenyl ketone. The Schmid reference also teaches that the presence of amines can determine the amount of yellowing (amines are sometimes used together with the photoinitiator for their photosynergistic properties). However, in the present invention, amines are preferably not used at all, or only in insubstantial amounts, to minimize yellowing.

In general, the photoinitiators can either initiate polymerization directly or can abstract a hydrogen atom from a donor species to create a donor radical which initiates polymerization. Examples of the first class include benzoin ethers, benzil ketals, and acetophenone derivatives. Examples of the second class include benzophenones and thioxanthones.

Suitable examples of relatively non-yellowing photoinitiators include hydroxycyclohexylphenyl ketone; hydroxymethylphenylpropanone; dimethoxyphenylacetophenone; 2-methyl-1-[4-(methyl thio)phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy) phenyl-(2-hydroxy-2-propyl)ketone; diethoxy-acetophenone; 2,2-di-sec-butoxyacetophenone; diethoxy-phenyl acetophenone; and mixtures of these. Commercially available examples include 2-hydroxy-2-methyl-1-phenyl-propan-1-one (Irgacure 1173, Ciba Geigy).

Phosphine oxide photoinitiators can be used including those having benzoyl and phenyl substituents on phosphorous. In a preferred embodiment, the photoinitiator, 2,4,6-trimethylbenzoyldiphenylphosphine oxide (Lucirin, BASF) is used in small but sufficient amounts (e.g., 1.5 wt. %). Some photoinitiators such as, for example, Irgacure 369, benzophenone, and Irgacure 907 are generally not desirable, particularly in large amounts, because they may tend to cause yellowing.

Cure speed in the present invention can be measured by conventional methods. Cure speed should be sufficient to provide 95% of maximum attainable modulus at a dose of about 1 $J/cm^2$, and more preferably, at about 0.7 $J/cm^2$ at a film thickness of 75 microns.

The photoinitiator system should be selected to allow for rapid production of optical fiber but also not to sacrifice substantially non-yellowing character. The person skilled in the art can balance these objectives in a particular application.

Photoinitiators are preferably selected for conventional ultraviolet light cure processes. However, cure can be effected by other types of cure including electron beam cure, wherein photoinitiator is not needed. The person skilled in the art can adapt the compositions accordingly. Therefore, photoinitiator is optional. Electron beam curing is disclosed in, for example, U.S. Pat. No. 4,716,209, the complete disclosure of which is hereby incorporated by reference.

In addition, for a UV-curing optical fiber coating process, the photoinitiator can be selected depending on whether a simultaneous cure of primary and secondary coating is used (i.e., wet-on-wet) or whether sequential cure is used. Such cure processes are discussed in, for example, U.S. Pat. No. 5,015,068, the complete disclosure of which is hereby incorporated by reference. The inner primary coating cure characteristics can affect what are the desirable outer primary or secondary coating cure characteristics. Conventional practice can be used to adapt the primary and secondary coatings to function with each other during optical fiber production.

The present invention also provides another preferred embodiment which also, upon cure, does not substantially yellow and has a relatively high Tg. This other embodiment does not provide compositions comprising urethane (meth) acrylate oligomer. Rather, the compositions comprise at least one radiation-curable fatty oil derivative and at least one radiation-curable bisphenol A derivative. That these cured compositions do not substantially yellow was particularly surprising because, as noted above, the prior art teaches that aromatic groups, and in particular, bisphenol A groups cause yellowing.

Fatty oil derivative means that fatty oils have been further functionalized by, for example, reaction of ethylenic unsaturation in the fatty acid component of the fatty oil.

The fatty oil derivative comprises (meth)acrylate groups, and preferably, acrylate groups. The fatty oil derivative can be based on any of the conventional unsaturated oils which have been derivatized to include the radiation-curable group. Before derivatization, these oils generally comprise fatty acid esters of glycerol, and in particular, unsaturated fatty acid esters.

Examples of suitable unsaturated oils that can be derivatized include unsaturated vegetable oils such as soybean oil, linseed oil, safflower oil, oiticica oil, caraway seed oil, rapeseed oil, castor oil, dehydrated castor oil, cotton seed oil, wood oil, vernonia oil, sunflower oil, peanut oil, olive oil, soybean leaf oil, maize oil, fish oil such as, for example, herring or sardine oil, and non-cyclic terpene oils.

Before they are derivatized, some unsaturated fatty oils are generally more resistant to yellowing than others, and use of such oils to prepare the radiation-curable derivative are preferred. Suitable non-yellowing oils include soya bean oil, poppyseed oil, dehydrated castor oil, tall oil, and the like.

The present invention is not limited by how the fatty oil derivative is prepared. Conventional methods can be used to carry out this derivatization. Commercial materials are available and can be used. Preferably, at least some of the unsaturated sites of the unsaturated oil are epoxidized and then at least partially acrylated.

The unsaturation in these oils can be converted to epoxy groups by conventional methods. See, for example, *Bailey's Industrial Oil and Fat Products*, 4th Ed. Vol. I at pgs. 130-131, the complete disclosure of which is hereby incorporated by reference. The epoxidized oil can then be converted to a (meth)acrylate functional oil by conventional methods. The invention is not limited by a particular amount of epoxidation or acrylation provided that substantial non-yellowing can be achieved.

Commercial products are available and can be used. For example, triacrylated epoxidized linseed oil (Henkel 3082) can be used. However, acrylated epoxidized soya oil is preferred.

Ingredients like soya oils and derivatives thereof may be purchased which may contain substantial amounts of impurities. However, such impurities are generally believed to be harmful to the present invention and are preferably minimized in favor of relatively pure ingredients.

The fatty oil derivative is preferably present in amounts of about 5 wt. % and about 50 wt %, and more preferably, between about 10 wt. % and about 40 wt. %, and more preferably, between about 15 wt. % and about 30 wt. %.

In addition to the fatty oil derivative, at least one bisphenol A derivative comprising (meth)acrylate groups is also present in the composition of the second embodiment. Bisphenol A derivative means that the phenolic groups of bisphenol A have been further functionalized so the hydroxyl moiety is no longer present. Conventional derivatives can be used, and commercially available derivatives have been found to be suitable.

The invention is not limited by how this bisphenol A derivative is prepared. Conventional synthetic methods can be used which couple an acrylate or methacrylate functionality with the phenolic hydroxy groups of bisphenol A. For example, the hydroxy groups of bisphenol A can be first epoxidized or alkoxylated. That product then can be further derivatized to be radiationcurable by conventional synthetic methods. For example, reaction with hydroxyethyl acrylate or acrylic acid can provide acrylate groups to the bisphenol A derivative. Such synthetic methods are within the skill of the art.

Preferably, mixtures of bisphenol A derivatives comprising (meth)acrylate groups are used. Each derivative can have more than two (meth)acrylate groups, but preferably has two per molecule.

The acrylated bisphenol A compound can be, for example, acrylated bisphenol A diglycidyl ether, ethoxylated bisphenol A diacrylate, or mixtures thereof. Preferably, a mixture of these components is used. Other suitable examples include propoxylated bisphenol-A-diacrylate, and in general, other alkoxylated bisphenol-A-diacrylate compounds.

The total amount of bisphenol A derivative comprising (meth)acrylate groups will be sufficient to provide a high glass transition temperature and is preferably between about 20 wt. % and about 90 wt. %, and more preferably, between about 25 wt. % and about 85 wt. %, and more preferably, between about 45 wt. % and about 85 wt. %.

When a mixture of acrylated bisphenol A diglycidyl ether and ethoxylated bisphenol A diacrylate is used, the amount of acrylated bisphenol A diglycidyl ether is preferably between about 5 wt. % and about 30 wt., and more preferably, between about 10 wt. % and about 25 wt. %. The amount of ethoxylated bisphenol A diacrylate, when used in the mixture, is preferably between about 40 wt. % to about 80 wt. %, and more preferably, between about 50 wt. % and about 70 wt. %.

In this second preferred embodiment, the optional photoinitiator can be a non-yellowing photoinitiator as discussed above with respect to the first embodiment. The amount is conventional, as discussed for the first embodiment. In the second embodiment, the photoinitiator is preferably a mixture of Lucirin TPO and 1-hydroxycyclohexylphenylacetone (Irgacure 184, Ciba Geigy) in amounts which can be determined by one skilled in the art and described above for the first embodiment. Another example of a suitable photoinitiator is Irgacure 1173.

For both the first and second embodiments of this invention, additives can be included in the formulations to improve and optimize properties (optional photoinitiator is not here an additive). Conventional additives can be included in the compositions to the extent that the given application demands them and to the extent that substantial non-yellowing is achieved. Thus, small amounts of additives may be tolerable and may not generate substantial yellowing, whereas larger amounts of the same additives may cause yellowing. The person skilled in the art can determine the extent to which additives can be used.

Moreover, components are preferably bound into the coating after cure, but many additives are not bound. Binding is preferably by covalent bonding. The total amount of unbound additive, after a radiation-cure, can be generally less than about 10 wt. %, and preferably, less than about 5 wt. %, and more preferably, less than 3 wt. %. If an additive is unbound after cure, it can migrate in the cable structure which may cause harm.

Additives can be conventional and include antioxidants, silane adhesion promoters (if contact with glass fiber is required), chain transfer agents, thermopolymerization inhibitors, leveling agents, preservatives, plasticizers, lubricants, solvents, fillers, anti-aging agents, wettability improvement agents, painted surface improvement agents, hindered amine light stabilizers, and the like may be blended into the composition. Additives can be used to prevent gelation of the coating and allow for long shelf life. Examples of shelf life stabilizers include phenothiazine and butylatedhydroxy toluene (BHT).

A preferred thermal antioxidant is a conventional hindered phenol such as, for example, Irganox 1035 which can be present in small but effective amounts such as, for example, about 1 wt. %, which are sufficient to impart desirable characteristics to the coating. The publication entitled "Thermo-oxidative Aging of a Primary Lightguide Coating in Films and Dual-Coated Fibers" by Simoff et al. *Polymer Eng. & Science*, 1989, Vol. 29, pgs. 1177–1181 teaches stabilization of polyether-based coatings by use of additives, the complete disclosure of which is hereby incorporated by reference. In addition, well-known lubricants such as dimethylsiloxanes like, for example, DC 57 and DC 190, also can be included in small but effective amounts (e.g. total amount about 0.5–2 wt. %). Conventional slip agents can be useful for matrix materials.

Prevention of color change and reducing the rate of color change are important aspects of the present invention. Substantially colorless materials which stay colorless upon aging are particularly needed. Ideally, the materials are and remain water white, and in preferred embodiments, the compositions are substantially colorless. However, if desired, colored materials can be used, although the color should not substantially change with aging. Desirable color can be imparted to the protective materials with use of, for example, pigments, dyes, or colorants. UV absorbers can be used.

UV curable ink compositions can be formulated as disclosed in, for example, the publication entitled "Ultraviolet Color Coding of Optical Fibers—a Comprehensive Study" by S. Vannais and Jim Reese in *Wire Journal International*, October 1991, pgs. 71–76. Color change of UV-cured inks is discussed in the publication by D. Szum in *Polymers Paint Colour Journal*, Nov. 24, 1993, VOL 183, pgs. 51–53. These references are hereby incorporated by reference.

The coatings can be used to protect optical fiber by methods well-known in this technical art. For example, the compositions can serve as secondary coatings, tertiary coatings, bundling or matrix materials. The term coating encompasses all such optical fiber protective and structural materials and is not limited by, for example, the thickness of the coating. The inner primary and/or outer primary coating which can be used together with the compositions of the present invention in the optical fiber or cable are not particularly limited. The compositions can also be tailored to serve as single coatings if allowance is made for the coating to be soft enough (e.g., modulus less than about 2,000 psi) and to be in contact with glass (e.g., include adhesion promoter). Single coatings are disclosed in, for example, U.S. Pat. No. 4,932,750, the complete disclosure of which is hereby incorporated by reference.

Conventional methods can be used to prepare optical fiber articles such as, for example, coated fibers, ribbons, and cables which comprise the present compositions in cured form. All materials surrounding the glass optical fiber are preferably oxidatively, hydrolytically, and thermally stable and do not substantially yellow or discolor. All components of the cable system must be considered together as a single system. For example, it is preferred that components in the cable structure not be used which may migrate over time into the composition of the present invention and cause substantial yellowing. Patents disclosing methods and structures pertaining to the preparation of coated optical fiber and optical fiber cables include U.S. Pat. Nos. 4,900,126 to Jackson et al.; and 4,701,016 to Gartside et al, the complete disclosures of which are hereby incorporated by reference. In addition, EP Pat. Publication No. 0,407,004 (A2) discloses processes for preparing optical fiber ribbons, the complete disclosure of which is hereby incorporated by reference. A patent further discussing the desirable properties of a secondary coating is U.S. Pat. No. 4,514,037 to Bishop et al, the complete disclosure of which is hereby incorporated by reference.

For all components discussed herein (e.g., additives, photoinitiators, or slip agents), mixtures of these components can be used to enhance and optimize properties in view of the cable design. In many cases, some properties will need to be sacrificed to attain other desirable properties in view of the cable design.

For both the first and second embodiments of the present invention, substantial non-yellowing is defined by means of the following examples. Yellowing is the most common form of discoloration, but all discoloration or color change is harmful and to be substantially avoided in the present invention. The presently disclosed compositions are substantially non-yellowing in a wide variety of aging environments. Aging environments include heat (e.g., 95° C. or 125°), elevated humidity (e.g., 95% RH), light (UV and fluorescent), and combinations thereof.

In particular, non-yellowing is measured by a color change delta E value ($\Delta E$) which is required to be less than about 12, and preferably, less than about 10, and more preferably less than about 7, and most preferably less than about 5 despite aging at 125° C. for four weeks. In general, the cured compositions of the first embodiment yellow slightly more than those of the second embodiment, although both embodiments result in yellowing of less than 12 after four weeks at 125° C. As noted above, small amounts of yellowing can be tolerated to optimize other properties together with yellowing. Non-yellowing is not necessarily maximized. However, the yellowing should not increase to more than about 12, and preferably, not more than about 10, and more preferably, not more than about 7, and most preferably, not more than about 5 in preferred embodiments. In contrast, allegedly non-yellowing prior art compositions are believed to exhibit delta E values of more than 12 after such severe aging for long time periods.

In another embodiment, mixtures or blends of the compositions of the first and second preferred embodiments can be used. Thus, for example, a composition according to the first embodiment can be prepared, and then, a composition according to the second embodiment can be prepared. The two prepared compositions can be mixed, and the mixture cured. The amount of each composition can be determined by the person skilled in the art. For example, the amount of the first composition can be between about 20 wt. % and about 80 wt. %, the substantial balance being the second composition. Alternatively, one composition can be used in small amounts as an additive for the other.

The compositions of the present invention are defined in part in terms of pre-mixture ingredients. Some reaction or interaction of components is possible after mixture of ingredients. The present invention, however, is not limited by such post-mixing phenomena.

Also, for all embodiments, yellowing can be influenced by the purity of the ingredients, and in general, more pure components are preferred. However, some ingredients routinely contain additives like the inhibitor methyl ethyl hydroquinone (MEHQ) which may tend to cause yellowing. Such additives, if possible, should not be present, and if necessary, can be removed. Ingredients are preferably purchased from suppliers which provide purer forms of the ingredients.

The present invention also encompasses methods for making both pre-cure and post-cure compositions by a pre-selection of ingredients to achieve heretofore unseen combinations of properties. It also encompasses methods for making apparatuses such as optical fibers, ribbons, and cables containing these non-yellowing cured coating compositions. Production of such structures is within the skill of the art.

The invention is further illustrated by means of the following non-limiting examples. All percentages are by weight unless otherwise indicated.

EXAMPLES

Example 1

A radiation-curable composition was prepared by mixing the following pre-mixture ingredients:

1) a radiation curable urethane acrylate oligomer comprising a polypropylene glycol backbone which is described further below (47%),
2) hexanediol diacrylate, SR 238 (6%),
3) isobornyl acrylate, SR 506 (12%),
4) trishydroxyethylisocyanurate triacrylate (THEICTA), SR 368 (31.5%),
5) photoinitiator, Lucirin TPO (1.5%), (BASF)
6) thermal antioxidant, Irganox 1035 (1.0%), (Ciba Geigy), and
7) dimethylsiloxane slip agents, DC 57 (0.36%) and DC 190 (0.64%) (Dow Corning).

The polypropylene glycol-based oligomer was prepared by reaction of the following premixture ingredients:

1) polypropylene glycol, 52.92%, (700 MW polypropylene glycol diol, ARCO PPG725 polyol from ARCO Chemical)
2) isophorone diisocyanate (30.81%), (Huls), and
3) hydroxyethyl acrylate (16.09%), (ROCRYL 420, Rohm&Haas). Reaction was carried out in the presence of butylated hydroxy toluene (0.1%) and catalyst dibutyltin dilaurate (0.08%). Final reaction was effected at sufficiently elevated temperature until the percent NCO content is less than 0.2.

The viscosity of the formulated composition was about 7070 cps. Blending of the ingredients was effected at temperatures above room temperature but not so high as to cause degradation or premature polymerization. The coating formulation was filtered.

The composition was applied to mylar plates by customary film preparation methods and cured by exposure to ultraviolet light. Cured films on mylar plates are generally used in the industry to simulate the coatings of actual coated optical fibers.

The following mechanical properties were measured by conventional methods: tensile strength (32 MPa); elongation (19%); modulus (973 MPa).

The color aging behavior (delta E) of the cured films was measured by conventional methods as disclosed in the publication entitled "A Measurement of the Contribution of UV Cured Coatings and Ink Binders Towards Color Change of UV Cured Inks" by D. M. Szum in Radtech Europe '93 Conference Proceedings (papers presented at the Radtech Europe Conference held May 2–6, 1993), the complete disclosure of which is hereby incorporated by reference. This publication discloses measurements which were performed on three layer samples, whereas the samples of the present invention were single layers. The measurement involves a mathematical manipulation, FMC-2. The values (delta E) were:

after one month at 125° C., 8.7;
after one month at 95° C., 6.7;
after one month at 95° C., 95% RH, 3.1,
after one month under QUV, 2.7, and
after one month under fluorescent light, 1.5.

Yellowing measurements were carried out with film samples about 2×2 inches square. Color measurement data was obtained from a Macbeth Series 1500 Color Measurement System (Model 2020). The calorimeter was calibrated and set to the following parameters:

Illuminant: D for Primary and Secondary Illuminants
Color Difference: FMC-2
Mode: 2, COL
Area of Measurement: Large Area View
Specular Component: Excluded (SCE)
UV filter: Included
Background: White calibration standard Additional aging tests demonstrated that the cured composition had excellent stability with respect to its rubbery modulus and glass transition temperature (measured as a tan δ maximum). For an unaged sample, rubbery modulus was measured to be 36 MPa and Tg to be 101° C. Then, aging studies were carried out for various aging times and conditions, as shown below, and modulus and Tg values measured. The following results were obtained (the tan δ maximum, Tg, is given first in parentheses, and rubbery modulus is given second):

one week at 125° C. (95° C., 28 MPa),
one month at 125° C. (100° C., 29 MPa),
one month at 95° C. (101° C., 31 MPa),
one month at 95° C. and 95% RH (103° C., 27 MPa),
one month under QUV (106° C., 22 MPa),
one month under fluorescent light (112° C., 35 MPa), and
one week at 120° C. and 100% RH (93° C., 24 MPa).

Hence, modulus and Tg changes were less than about 30% despite aging.

The elastic modulus (E'), the viscous modulus (E"), and the tan delta (E"/E') were measured using a Rheometrics Solids Analyzer (RSA-11), equipped with: 1) a personal computer having MS-DOS 5.0 operating system and having Rhios® software (Version 4.2.2 or later) loaded; and 2) a liquid nitrogen controller system for low-temperature operation. The maximum value of the tan delta measured is the Tg.

The test samples were prepared by casting a film of the material, having a thickness in the range of 0.02 mm to 0.4 mm, on 5 mil polyester. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −80° C. and increasing the temperature at about 1°/minute until the temperature reached a point at which the equilibrium modulus has been reached. The test frequency used was 1.0 radian/second.

Example 1 illustrates a first preferred embodiment of the present invention. The following example 2 illustrates a second preferred embodiment of the present invention.

Example 2

A radiation-curable composition suitable for coating optical fibers was prepared based on the following pre-mixture ingredients:

1) bisphenol-A-ethoxylated diacrylate (60%), (SR 349)
2) Photomer 3005 (20%), which is acrylated epoxidized soy oil; (Henkel)
3) Photomer 3016 (17%), which is bisphenol-A-diglycidylether acrylate; (Henkel)
4) Lucirin TPO (2%),
5) Irgacure 184 (1%).

The composition was cured on mylar, (1.0 J/cm$^2$, D lamp, air). The tan delta maximum Tg of the cured composition was about 77° C.

The color change (delta E) versus aging time at 125° C. was measured, and the results are shown graphically in FIG. 1. The delta E value after one week was only 1.05; after two weeks was only 1.91; after three weeks was only 2.26; and after four weeks was only 3.7. This non-yellowing was much less than a comparative example which is generally held to represent an industry standard for non-yellowing coatings.

Comparative Example A

The color change (delta E) versus aging time was measured for a prior art, commercially available optical fiber coating material (secondary coating) known as CSB2 which is generally considered to be substantially non-yellowing. The composition of the material is believed to be disclosed in U.S. Pat. No. 5,146,531. The results for this coating are illustrated in FIG. 1 in comparison with the results for the coating of Example 2. After one week at 125° C., the delta E value was 7.05; after two weeks, was 10.38; after three weeks, was 11.77; after four weeks, was 13.31. Hence, yellowing was substantially greater in the comparative example.

Example 3

An additional composition was prepared which, like the Example 1 composition, was also based on a urethane acrylate oligomer comprising a polyether backbone. The following pre-mixture ingredients were mixed:

1) a polypropylene glycol oligomer which is described further below (50.00%)
2) hexanediol diacrylate (5.00%)
3) isobornyl acrylate (10.00%)
4) THEICTA (31.5%)
5) Lucirin TPO (1.0%)
6) Irganox 1010 (0.5%)
7) Tinuvin 292 (0.5%) (Ciba Geigy)
8) DC 57 (0.36%)
9) DC 190 (0.64%)

The ingredients were mixed at about 80° C. to yield compositions having viscosities of about 5,000 cps.

The oligomer was prepared by a reaction process which included the reaction of the following pre-mixture ingredients:

1) polypropylene glycol diol (NIAX PPG 725), (53.96%)
2) isophorone diisocyanate, (28.67%)
3) hydroxyethyl acrylate (17.19%) in the presence of BHT (0.1%) and dibutyltin dilaurate (0.08%). Reaction stoichiometry was adjusted so that molecular weight of about 1,350 was achieved. The composition of Example 3 is believed to have contained, as a result of the synthesis method, relatively more of the reaction product of isophorone diisocyanate with hydroxyethyl acrylate compared with the compositions of Example 1. This raises Tg to over 120°.

Cured compositions were characterized in terms of tensile strength (30 MPa), elongation (11%), and modulus (740 MPa). The composition is expected to be substantially non-yellowing.

Although the compositions illustrated in the Examples are generally tailored to function, after cure, as secondary coatings or matrix materials, they can function in other capacities as well. Thus, if properly formulated, they can function as single coatings, higher modulus primary coatings, and other materials which may surround and protect the optical fiber in a cable structure. Optical fiber technology and its nomenclature will continue to evolve in coming years, and the compositions can be applied to present and new technology. Therefore, the invention is not limited to any one particular application. In addition, applications outside the optical fiber field are envisioned wherein the application requires substantially non-yellowing coatings. Examples of such applications include various UV applications including paper saturated coatings and wood coatings.

The examples help illustrate that the present invention achieves unexpected advantages not attained or suggested by the prior art.

All publications and references discussed herein are hereby incorporated by reference.

While the invention has been disclosed in detail and with reference to specific embodiments thereof, it will be apparent to those of ordinary skill in the art that various changes and modifications can be made therein without departing from the spirit and scope thereof.

What is claimed is:

1. An optical fiber apparatus fiber transmitting light signals comprising:

at least one optical fiber transmission path; and at least one protective coating for said transmission path, wherein said coating is obtained by radiation curing a radiation-curable composition comprising the following pre-mixture ingredients:

(a) about 20 wt. % to about 80 wt. %, relative to the total weight of said composition, of at least one urethane (meth)acrylate oligomer having a backbone comprising at least one polyether repeat unit; and (b) about 20 wt. % to about 80 wt. %, relative to the total weight of said composition, of at least one monomer diluent;

wherein said oligomer and/or said diluent comprise at least one isocyanurate group, and said coating exhibits a non-yellowing, delta E value of less than about 12 after four weeks of aging at 125° C. and exhibits a glass transition temperature greater than about 50° C.;

and wherein said coating composition comprises no ingredients which form extended conjugation within said four weeks of aging at 125° C.

2. An apparatus according to claim 1, wherein said non-yellowing, delta E value is less than 7.

3. An apparatus according to claim 1, wherein said non-yellowing, delta E value is less than 5.

4. An apparatus according to claim 1, wherein said glass transition temperature is greater than about 70° C.

5. An apparatus according to claim 1, wherein said glass transition temperature is greater than about 90° C.

6. An apparatus according to claim 1, wherein said coating is a radiation-cured product of a radiation-curable composition which has a cure speed, measured with respect to a 95% cure, of equal to or faster than about 1 J/cm$^2$.

7. An apparatus according to claim 1, wherein said apparatus is an optical fiber cable.

8. An apparatus according to claim 1, wherein said apparatus is an optical fiber ribbon.

9. An apparatus according to claim 8, wherein said coating is a matrix material.

10. An apparatus according to claim 1, wherein said apparatus is a coated optical fiber.

11. An apparatus according to claim 10, wherein said coated optical fiber comprises an inner primary protective coating and an outer primary protective coating, and wherein said outer primary protective coating is obtained by curing said radiation-curable composition.

12. An apparatus according to claim 1, wherein said coating has a rubbery modulus of at least about 8 MPa.

13. An apparatus according to claim 1, wherein substantially all of said at least one isocyanurate group is present in said diluent B rather than said oligomer A.

* * * * *